(12) United States Patent
Abe et al.

(10) Patent No.: US 7,504,164 B2
(45) Date of Patent: Mar. 17, 2009

(54) CORROSION-RESISTANT MEMBER AND PROCESS OF PRODUCING THE SAME

(75) Inventors: Masanori Abe, Yokohama (JP); Koyata Takahashi, Sagamihara (JP)

(73) Assignee: Tosoh Corporation, Yamaguchi (JP)

( * ) Notice: Subject to any disclaimer, the term of this patent is extended or adjusted under 35 U.S.C. 154(b) by 240 days.

(21) Appl. No.: 11/085,202

(22) Filed: Mar. 22, 2005

(65) Prior Publication Data

US 2005/0214580 A1     Sep. 29, 2005

(30) Foreign Application Priority Data

Mar. 23, 2004  (JP)  .......................... P. 2004-085007
Sep. 30, 2004  (JP)  .......................... P. 2004-287477

(51) Int. Cl.
  *B32B 9/00*  (2006.01)
(52) U.S. Cl. ..................................... 428/698
(58) Field of Classification Search ................. 428/698, 428/701; 427/455, 456
  See application file for complete search history.

(56) References Cited

U.S. PATENT DOCUMENTS 5,212,123 A * 5/1993 Schoennahl .................. 501/87
5,780,116 A   7/1998 Sileo et al.
5,856,015 A * 1/1999 Buchanan .................... 428/426

FOREIGN PATENT DOCUMENTS

| JP | 7-187826 A | 7/1995 |
|---|---|---|
| KR | 2001-0055811 | 7/2001 |
| KR | 2001-055811 A | 7/2001 |

OTHER PUBLICATIONS

S. Thiele et al., Microstructure and Proporties of Thermally Sprayed Silicon Nitride-Based Coatings (2002) Journal of Thermal Spray Technology, vol. 11(2), pp. 218-225.
European Search Report dated Jun. 20, 2005.

* cited by examiner

*Primary Examiner*—Keith D Hendricks
*Assistant Examiner*—Daniel Miller
(74) *Attorney, Agent, or Firm*—Sughrue Mion, PLLC

(57) ABSTRACT

A corrosion-resistant member comprising a base material having formed thereon a spayed coating having high corrosion resistance to corrosive gases or plasma, and a process of producing the same are disclosed. The corrosion-resistant member comprises a base material having formed thereon a sprayed coating, the sprayed coating being formed on the site of the base material to be exposed to corrosive gases or plasma and comprising Si, O, N, Group 2a element, and at least one element selected from the group consisting of Al, B, Zr and Ti, or comprises a base material having formed thereon a sprayed coating, the sprayed coating being formed on the site of the base material to be exposed to corrosive gases or plasma and comprising Si, O, N, Group 3a element, and at least one element selected from the group consisting of B, Zr and Ti.

7 Claims, 1 Drawing Sheet

FIGURE
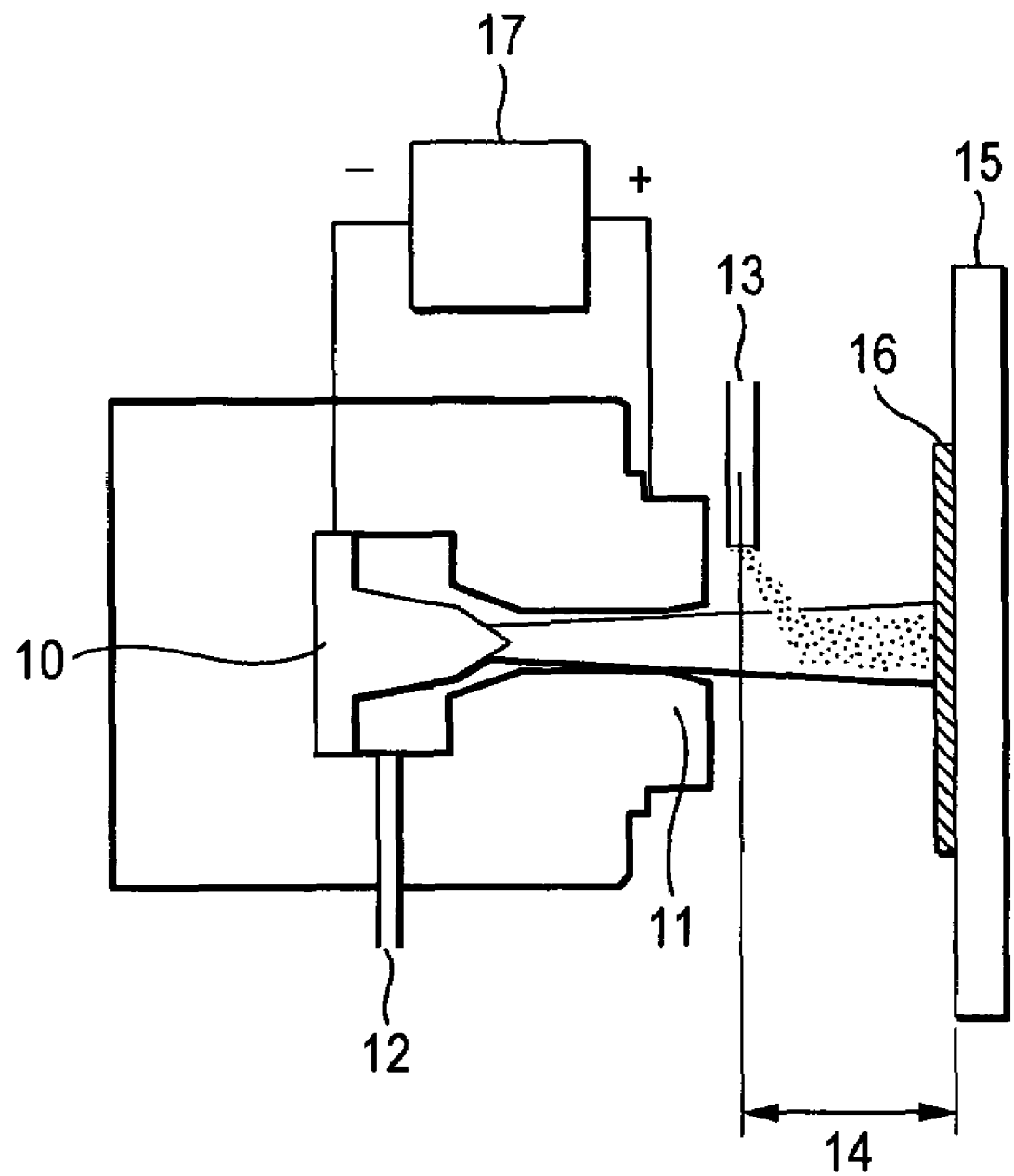

CORROSION-RESISTANT MEMBER AND PROCESS OF PRODUCING THE SAME

FIELD OF THE INVENTION

The present invention relates to a member to be used in CVD (Chemical Vapor Deposition) devices, plasma treatment devices (plasma etching devices) and the like in manufacturing semiconductors, and a process of producing the same. In particular, the present invention relates to a corrosion-resistant member comprising a base material having formed thereon a spayed coating having high corrosion resistance to corrosive gases or plasma, and a process of producing the same.

BACKGROUND ART

Corrosive gases are frequently used for plasma etching in the manufacturing step of semiconductors, etc., and cleaning application of CVD devices. For these corrosive gases, fluorine based or chorine based gases, and the like are used. As the fluorine based gases, $CF_4$, $C_2F_6$, $C_3F_8$, $CHF_3/CF_4$, $SF_6$, and the like are used, and for the Cl based gases, $Cl_2$, $BCl_3$, $CCl_4$, and the like are used. Further, it is also proposed to use HF, $F_2$, or $NF_3$.

In portions coming into contact with the above gases or plasma containing the gases, such as vessels, inner walls or parts, in which such corrosive gases are used, ceramics such as quartz, alumina, aluminum nitride, or metals such as aluminum or stainless steel are used. However, these members involved problems such that the member wastes away in a short period of time, and the member causes the generation of particles in the device.

For example, a quartz member reacts with a fluorine gas to form $SiF_4$, which is then sublimated, and thus wastes away. Further, in ceramic members such as alumina or aluminum nitride, although a fluoride of aluminum, $AlF_3$, is hardly sublimated, wastage occurs by physical sputtering or the like, and simultaneously corrosion selectively proceeds at the grain boundary or in pores of the member by plasma, whereby particles generate due to dropout of crystal particles.

As a method of solving these problems, a method is proposed, which suppresses the generation of particles by making the crystal grain boundary free and simultaneously introducing nitrogen to improve corrosion resistance, and it is proposed to use a glass constituted of Si—Al—O—N elements (see, for example, JP-A-11-228172). However, to produce such corrosion-resistant glasses, reducing atmosphere or inert atmosphere is required, resulting in a large scale of apparatus, and as a result, the corrosion-resistant member tends to be expensive. Further, such a composition is not always sufficient in corrosion resistance.

On the other hand, technologies for forming a sprayed coating on the surface of a base material protecting the base material are known, and it may be considered to form such a corrosion-resistant glass on a base material by spraying or coating. However, according to the conventional spraying technologies, the formation of a dense sprayed coating containing nitrogen has been difficult, and metals or oxide ceramics have mainly be used in the conventional formation of a protective film by spraying.

As the prior art technologies regarding formation of a sprayed coating containing nitrogen, for example, a method of forming an amorphous layer and YAG layer by spraying a mixed powder of AlN, $SiO_2$ and MgO to $Si_3N_4$, $Al_2O_3$ or $Y_2O_3$ by explosive spraying (R. B. Heimann, S. Thiele, L. M. Berger, M. Herrmann, M. Nebelung, B. Wielage, T. M. Schnick and P. Vuoristo, "Thermally Sprayed Silicon Nitride-Based Coatings on Steel for Application in Severe Operation Environments: Preliminary Results", Microstructural Science, vol. 26, 389 (1998); a method of forming a thermally sprayed silicon nitride coating by explosive spraying of β-SiAlON and χ-SiAlON powder obtained by heat treating a mixed powder of $Si_3N_4$, $Al_2O_3$, $ZrO_2$ and $TiO_2$; and a method of forming α-silicon nitride by plasma spraying of a mixed powder of $Si_3N_4$, $Al_2O_3$ and $Y_2O_3$ have been reported. However, since those sprayed coatings have high melting point, the sprayed powder which is not sufficiently melted deposits on a base material. As a result, bonding of mutual particles of the sprayed coating is weak, and the number of pores increases, resulting in decrease of density. Consequently, corrosion selectively proceeds at the grain boundary or in pores of the member in plasma etching, whereby particles tend to generate due to dropout of crystal particles. Further, durability of the sprayed coating to corrosive gases or plasma has not been sufficient. In addition, an apparatus used in explosion spraying is expensive, deposition efficiency of the sprayed coating is poor, and a metal base material such as aluminum may deform by wind pressure at explosion.

Thus, the technology of producing a dense sprayed coating containing nitrogen having good bonding of particles with each other and also being provided with very high corrosion resistance, using the conventional spraying method has conventionally required further improvement, and a corrosion-resistant member which does not cause generation of particles due to dropout of crystal particles during plasma etching and has good corrosion resistance to corrosive gases or plasma has been demanded.

As described above, in the step of using corrosive gases or plasma in a semiconductor production process, there have been the problems of particle generation due to corrosion of a member, contamination of a product due to such generation, gain decrease, and the like. There has been further problem of decrease in life of a member due to low corrosion resistance of the member. A vitreous corrosion-resistant member constituted of Si—Al—O—N elements for the purpose of suppressing this problem has been proposed. However, such a member has not always sufficient in corrosion resistance. On the other hand, spraying with $Si_3N_4$—$Al_2O_3$—$Y_2O_3$ system is possible, but the sprayed coating has low density. Further, it is necessary to solve the problem of particle generation.

SUMMARY OF THE INVENTION

Accordingly, one object of the present invention is to provide a corrosion-resistant member comprising a base material having formed thereon a vitreous sprayed coating which has high corrosion resistance, causes less generation of particles, can easily be produced, and contains nitrogen.

Another object of the present invention is to provide a process for producing the corrosion-resistant member.

As a result of extensive investigations in view of the above circumstances, it has been found that a material comprising Si, O, N, Group 2a element, and at least one element selected from the group consisting of Al, B, Zr and Ti is suitable for spraying, a dense sprayed coating having good bonding of particles with each other can be formed by spraying the material to a base material, and as a result, corrosion resistance of a member is markedly improved, and generation of particles is less.

It has further been found that a material comprising Si, O, N, Group 3a element, and at least one element selected from the group consisting of B, Zr and Ti is also suitable for spraying, and a dense sprayed coating having good bonding of particles with each other can be formed by spraying the material to a base material, and as a result, corrosion resistance of a member is markedly improved, and generation of particles is less.

BRIEF DESCRIPTION OF THE DRAWING

The attached FIGURE is a view showing one example of a plasma spraying device In the drawings, reference numerals and signs are as follows.
10: Cathode
11: Anode
12: Plasma gas
13: Spraying powder (supply pot)
14: Spraying distance
15: Base material
16: Sprayed coating
17: Power source

DETAILED DESCRIPTION OF THE INVENTION

The present invention is described in detail below.

First Embodiment

The first embodiment of the present invention is to provide a corrosion-resistant member comprising a base material having formed thereon a sprayed coating, the sprayed coating being formed on the site of the base material to exposed to corrosive gases or plasma and comprising Si, O, N, Group 2a element, and at least one element selected from the group consisting of Al, B, Zr and Ti.

The Group 2a element used herein means Group 2a element in the Periodic Table, and specifically means Be, Mg, Ca, Sr and Ba. The sprayed coating constituting the corrosion-resistant member of the present invention comprises glass as the main component. Therefore, the sprayed coating has low reactivity with corrosive gases or its plasma. Even if the sprayed coating is reacted with fluorine in the corrosive gas, the resulting product is a high boiling compound which is difficult to be etched by plasma. Thus, the sprayed coating has the effect to suppress etching with plasma or corrosive gases. The Group 2a element is preferably Mg.

Regarding the composition of the corrosion-resistant member in the first embodiment, when Zr is used, it is preferable that Zr:Si in ratio of the number of atoms are in a range of from 5:95 to 70:30, O:N in ratio of the number of atoms are in a range of from 99.9:0.1 to 60:40, and Zr+Si: Group 2a element in ratio of the number of atoms are in a range of from 75:25 to 40:60.

When Ti is used, it is preferable that Ti:Si in ratio of the number of atoms are in a range of from 5:95 to 80:20, O:N in ratio of the number of atoms are in a range of from 99.9:0.1 to 60:40, and Ti+Si:Group 2a element in ratio of the number of atoms are in a range of from 85:15 to 40:60.

When B is used, it is preferable that B:Si in ratio of the number of atoms are in a range of from 5:95 to 70:30, O:N in ratio of the number of atoms are in a range of from 99.9:0.1 to 60:40, and B+Si:Group 2a element in ratio of the number of atoms are in a range of from 85:15 to 40:60.

When Al is used, it is preferable that Al:Si in ratio of the number of atoms are in a range of from 0.1:99.9 to 70:30, O:N in ratio of the number of atoms are in a range of from 99.9:0.1 to 60:40, and Al+Si:Group 2a element in ratio of the number of atoms are in a range of from 95:5 to 50:50.

Where Zr, Ti, B or Al is used, when the Group 2a element is introduced as an oxide, oxygen contained in the oxide is not included in the above ratio.

The corrosion-resistant member according to the first embodiment is characterized in that the main component of the sprayed coating comprising Si, O, N, Group 2a element, and at least one element selected from the group consisting of Al, B, Zr and Ti is glass. Glass phase comprising Si, O, N and the Group 2a element has excellent corrosion resistance, and further due to glass, does not have crystal grain boundary. This makes it possible to suppress generation of particles due to dropout of the crystal particles by corrosion at the crystal grain boundary by corrosive gases or plasma containing corrosive gas during etching. Vitrification further proceeds in the glass phase by addition of N, and corrosion resistance of the member is further improved.

The corrosion-resistant member of the first embodiment further comprises a base material having formed thereon a sprayed coating comprising a glass phase which comprises Si, O, N and Group 2a element, and a crystal phase which comprises at least one selected from the group consisting of Zr and Ti. The characteristics of the glass phase comprising Si, O, N and Group 2a element are described hereinbefore. This composition is a eutectic composition. As a result, the sprayed coating has low melting point, and the deposited sprayed coating has a dense structure. The crystal phase comprising at least one selected from the group consisting of Zr and Ti has excellent corrosion resistance. The reason for this is that a reaction product formed by reacting this crystal phase with corrosive gases or plasma containing corrosive gas has high boiling point, and therefore does not gasify.

The eutectic composition includes a sprayed coating in which the crystal phase containing Zr is a cubic zirconium oxide having solid solubilized therein Group 2a element oxide. The cubic zirconium oxide crystal phase having solid solubilized therein Group 2a element oxide has excellent corrosion resistance. The reason for this is that a reaction product formed by reacting Group 2a element or zirconium in the cubic zirconium oxide crystal phase having solid solubilized therein Group 2a element oxide, with corrosive gas or plasma containing corrosive as has high boiling point, and therefore does not gasify. The sprayed coating of cubic zirconium oxide having solid solubilized therein the Group 2a element can include a cubic zirconium oxide having solid solubilized therein magnesium oxide.

The corrosion-resistant member of the first embodiment further comprises a base material having formed thereon a sprayed coating comprising a glass phase which comprises Si, O, N and Group 2a element, and a crystal phase containing B. The characteristics of the glass phase comprising Si, O, N and Group 2a element are described hereinbefore. This composition is a eutectic composition. As a result, the sprayed coating has low melting point, and the deposited sprayed coating has a dense structure. Example of this crystal phase is boron nitride.

Second Embodiment

The second embodiment of the present invention is to provide a corrosion-resistant member comprising a base material having formed thereon a sprayed coating, the sprayed coating being formed on the site of the base material to exposed to corrosive gases or plasma and comprising Si, O, N, Group 3a element, and at least one element selected from the group consisting of B, Zr and Ti.

The Group 3a element used herein means Group 3a element in the Periodic Table, and specifically means Sc, Y and lanthanoid element. The material containing Group 3a element, Zr and Ti has low reactivity with corrosive gases or its plasma. Even if the sprayed coating is reacted with fluorine in the corrosive gas, the resulting product is a high boiling compound. Thus, the sprayed coating has the effect to suppress etching with plasma or corrosive gases.

Regarding the concentration of each component in the corrosion-resistant member in the second embodiment, when Zr and/or Ti are used, it is preferable that the concentration of the Group 3a element is in a range of 10-78 atomic %, the concentration of Si is in a range of 20-88 atomic %, and the concentration of Zr and/or Ti is in a range of 2-70 atomic %. The concentration of nitrogen in the corrosion-resistant member is preferably in a range of 0.01-15 wt %.

When B is used, it is preferable that B:Si in ratio of the number of atoms are in a range of from 5:95 to 70:30, O:N in ratio of the number of atoms are in a range of from 99.9:0.1 to 60:40, and B+Si:Group 3a element in ratio of the number of atoms are in a range of from 85:15 to 40:60. In this case, when the Group 3a element is introduced as an oxide, oxygen contained in the oxide is not included in the above ratio.

The corrosion-resistant member according to the second embodiment is characterized in that the main component of the sprayed coating comprising Si, O, N, Group 3a element, and at least one element selected from the group consisting of B, Zr and Ti is glass. Glass phase comprising Si, O, N and the Group 3a element has excellent corrosion resistance, and further due to glass, does not have crystal grain boundary. This makes it possible to suppress generation of particles due to dropout of the crystal particles by corrosion at the crystal grain boundary by corrosive gases or plasma containing corrosive gas during etching. Vitrification further proceeds in the glass phase by addition of N, and corrosion resistance of the member is further improved.

The corrosion-resistant member of the second embodiment further comprises a base material having formed thereon a sprayed coating comprising a glass phase which comprises Si, O, N and Group 3a element, and a crystal phase which comprises at least one selected from the group consisting of Zr and Ti. The characteristics of the glass phase comprising Si, O, N and Group 3a element are described hereinbefore. This composition is a eutectic composition. As a result, the sprayed coating has low melting point, and the deposited sprayed coating has a dense structure. The crystal phase comprising at least one selected from the group consisting of Zr and Ti has excellent corrosion resistance. The reason for this is that a reaction product formed by reacting this crystal phase with corrosive gas or plasma containing corrosive gas has high boiling point, and therefore does not gasify.

The eutectic composition includes a sprayed coating in which the crystal phase containing Zr is a cubic zirconium oxide having solid solubilized therein Group 3a element oxide. The cubic zirconium oxide crystal phase having solid solubilized therein Group 3a element oxide has excellent corrosion resistance. The reason for this is that a reaction product formed by reacting Group 3a element or zirconium in the cubic zirconium oxide crystal phase having solid solubilized therein Group 3a element oxide, with corrosive gas or plasma containing corrosive as has high boiling point, and therefore does not gasify. The sprayed coating of cubic zirconium oxide using the Group 3a element can include a cubic zirconium oxide having solid solubilized therein yttrium oxide.

The corrosion-resistant member of the second embodiment further comprises a base material having formed thereon a sprayed coating comprising a glass phase which comprises Si, O, N and Group 3a element, and a crystal phase containing B. The characteristics of the glass phase comprising Si, O, N and Group 3a element are described hereinbefore. This composition is a eutectic composition. As a result, the sprayed coating has low melting point, and the deposited sprayed coating has a dense structure. Example of this crystal phase is boron nitride.

THIRD EMBODIMENT

The production process of the corrosion-resistant member according to the first and second embodiments is described below as the third embodiment.

The corrosion-resistant member can be produced by forming a corrosion-resistant sprayed coating on a base material by spraying.

The spraying method used is preferably a plasma spray. The FIGURE shows a general plasma spraying device. The plasma spraying device functions as follows. Plasma gas 12 flown between an anode 11 and a cathode 12 causes arc discharge to form a plasma jet. The plasma jet is used as a heat source to melt a spraying powder 13. The molten spraying powder strikes a base material 15 and deposits thereon.

The plasma spraying device can use an inert gas such as $N_2$ or Ar, reducing gas such as $H_2$, or a mixed gas of those, as a plasma gas. Where a nitrogen-containing substance is sprayed, if a plasma gas contains oxygen, decomposition occurs during spraying, and nitrogen disappears from the sprayed coating, resulting in deterioration of corrosion resistance. Therefore, an inert gas or reducing gas should be used as a plasma gas. Flow rate of the spraying gas is preferably 50 SLM (Standard Littler per Minute) or higher. Content of nitrogen in the sprayed coating is measured as follows. Surface of the sprayed coating is subjected to fluorescent X-ray analysis or EPMA analysis, or nitrogen analyzer is used, in which a small amount of the sprayed coating cut off is heat decomposed, and nitrogen gas generated is subjected to thermal conductivity measurement.

Other than the plasma spraying method, the sprayed coating of the present invention can be produced by general spraying methods such as a flame spray or a high velocity flame spray. In this case, the sprayed coating can be formed under the general flame spraying conditions, but the spraying is preferably conducted with flame under reducing atmosphere in which a fuel is excess to oxygen or the like.

In the spray of the present invention, spraying power applied in spraying a spray flame to a base material varies depending on a device used. For example, where the plasma spraying device as shown in the FIGURE is used, the condition can be exemplified that a spraying power is 20 kW or higher.

When producing the corrosion-resistant member, a spray distance that is a distance between a tip of spray gun and a base material under ordinary pressure is preferably 40-150 mm. Where the distance exceeds 150 mm, a base material is cooled until depositing a spraying material on a base material, and a sprayed coating may not be deposited on the base material. On the other hand, where the distance is shorter than 40 mm, both the temperature of a base material and the temperature of a sprayed coating rise, nitrogen disappears by decomposition of a nitride that is a spraying material, and corrosion resistance may deteriorate.

Spraying material used in the present invention has a composition comprising Si, O, N, Group 2a element, and at least one selected from the group consisting of Al, B, Zr and Ti, or a composition comprising Si, O, N, Group 3a element, and at least one selected from the group consisting of B, Zr and Ti. The spraying material is preferably used in a form of powder.

Such a spraying material is, for example, a granular mixture comprising silica, silicon nitride, Group 2a element oxide, and zirconia, and can be prepared by, for example, mixing a powder comprising silica, silicon nitride, Group 2a element oxide, and zirconia in prescribed proportions, sintering or melting the resulting mixture in reducing atmosphere under pressure or atmospheric pressure to prepare an ingot, and pulverizing the ingot. The spraying material can also be prepared by, for example, a method of preparing a slurry of a mixed powder containing silica, silicon nitride, Group 2a element oxide, and zirconia, spray drying the resulting mixed slurry to prepare a granule, and sintering the granule. In the above method, a binder such as an acrylic binder may be added, if required and necessary.

Particle diameter of the starting powder used in the spraying is not particularly limited. It is preferable for the starting powder to have an average particle diameter (secondary particle diameter) of 10-100 μm. Where the average diameter is smaller than 10 μm, the starting powder itself does not have sufficient flowability, and as a result, it may be difficult to uniformly supply the starting powder to a spraying flame. On the other hand, where the average diameter is larger than 100 μm, spraying particles are not melted uniformly, and as a result, the sprayed coating obtained may have poor adhesion to a base material.

The base material used in the present invention is not particularly limited. Examples of the base material include heat-resistant glasses such as quartz glass, metals such as aluminum or stainless steel, ceramics such as alumina or mullite, and resins such as polyimide or polycarbonate.

Surface of the base material used has a surface roughness Ra of preferably 1-50 μm, more preferably 1-15 μm. When the base material has a surface roughness of 1-50 μm, adhesion between the base material and the sprayed coating is further improved. Where the surface roughness is smaller than 1 μm, the sprayed coating may separate from the base material, making it difficult to uniformly applying a corrosion-resistant glass sprayed coating to the base material. On the other hand, where the surface roughness exceeds 50 μm, it may be difficult to make the surface of the sprayed coating smooth, making it difficult to suppress etching by plasma or corrosive gas. Examples of the method of forming a surface roughness of 1-50 μm on the base material surface include a method of forming a sprayed coating having such a surface roughness, a method of blast treating the base material, and a method of conducting a blast treatment and a chemical etching by, for example, hydrofluoric acid.

Thickness of the sprayed coating of the corrosion-resistant member is not particularly limited. The thickness is preferably 0.01-3 mm, more preferably 0.01-0.5 mm. Where the thickness of the sprayed coating exceeds 3 mm, cracks or peeling of the sprayed coating may occur due to the difference in a coefficient of thermal expansion between such a sprayed coating and the base material. On the other hand, where the thickness is smaller than 0.01 mm, such a sprayed coating may be not sufficient as a protective film. Thickness of the sprayed coating can be confirmed by, for example, observing a cross section of the member with a microscope, or subjecting the cross section of member to a compositional analysis of structural elements with EPMA (X-ray analyzer).

The sprayed coating has a surface roughness Ra of preferably 0.01-10 μm, more preferably 8 μm or smaller. Where the surface smoothness of the sprayed coating is poor and rough, projection-shaped portions, particularly edges, formed on the sprayed coating surface are selectively etched with plasma or corrosive gases, and particles are liable to generate.

Particles are liable to generate with increasing roughness of the surface. This can be evaluated by polishing the surface of the sprayed coating, plasma etching the polished surface, and measuring a surface roughness Ra before and after plasma etching. Where difference in Ra before and after plasma etching is large, the surface is roughened by etching, and it is therefore presumed that many particles generate.

In forming the sprayed coating, the spraying is preferably conducted after previously pre-heating the surface of the base material. Previous pre-heating is effective to prevent breakage of the base material due to thermal shock in spraying, and to obtain a corrosion-resistant member having high adhesion. The pre-heating temperature varies depending on the kind of the base material used. In the case of a quartz glass base material, the pre-heating temperature is preferably 100-800° C., in the case of an aluminum base material, the pre-heating temperature is preferably 50-500° C., and in the case of a resin base material, the pre-heating temperature is preferably 50-200° C.

Where the pre-heating temperature is too high, nitrogen in the sprayed coating decomposes, which is not preferable. The pre-heating is conducted such that a base material is heated with an external heater, or a base material is irradiated with a spraying flame without supplying a raw material. The pre-heating temperature can be measured, for example, with a thermocouple from the back surface of the base material, or non-contact radiation type thermometer.

In producing the corrosion-resistant member of the present invention, the base material temperature is preferably 100-800° C. in the case of a plasma spraying using an inert gas or a reducing gas under atmospheric pressure. Although depending on the kind of the base material used, the base material temperature is preferably 50-800° C. in the case of glass or ceramic base material. Where the base material temperature is lower than 50° C., the spraying material is cooled when depositing the same on the base material, and the quality of the sprayed coating on the base material may deteriorate. On the other hand, where the base material temperature is higher than 800° C., nitrogen disappears by decomposition of a nitride which is a spraying material, and corrosion resistance may deteriorate. In the case of a resin base material, the base material temperature is preferably 50-300° C., although varying depending on the kind of resin used.

The corrosion-resistant member according to the present invention can be used in vessels or parts of film-forming devices or plasma treatment devices. With respect to a method of using the corrosion-resistant member, the corrosion resistant material can be used in a site contacting with a corrosive gas or plasma in these devices. More specifically, it can be used as a ring-like focus ring or a bell-jar.

The film-forming device as referred to herein includes, for example, a CVD (chemical vapor deposition) device and a PVD (physical vapor deposition) device. It is general to cleanup reaction tubes, bell-jars, and the like with a fluorine based gas after the use. In this case, there were encountered problems such as corrosion due to the cleaning and the generation of particles caused thereby. However, using the corrosion resistant member of the present invention can overcome those problems.

The plasma treatment device as referred to herein includes, for example, a plasma etching device and a plasma cleaning device, and means a device of exposing an article placed in the device to plasma, thereby peeling or cleaning up the surface of the article. Since etching with fluorine based plasma is carried out in ring-like focus rings or bell-jars, etc., of these devices, the generation of particles gave rise the problem in a site where a part in the device contacts with a corrosive gas or plasma. Similarly, even in this case, when the corrosion resistant member of the present invention is used, it is difficult to be corroded and the generation of particles can be decreased.

The corrosion-resistant member according to the present invention has high corrosion resistance and involves less generation of particles. Therefore, when the member is used in devices using a corrosive gas or plasma, such as CVD device or plasma treatment device, a product can be prevented form contamination, and continuous operation is possible with high product gain.

The present invention is described in more detail by reference to the following Examples, but it should be understood that the invention is not construed as being limited thereto.

EXAMPLES 1 TO 3

1) Preparation of Base Material to be Sprayed

Quartz glass was blast treated to have a surface roughness (Ra) of 6 μm. The quartz glass was further treated with 24% hydrofluoric acid for 1 hour to have a surface roughness (Ra) of 10 μm. Thus, a quartz glass base material was obtained.

2) Preparation of Raw Material Powder for Spraying

Silicon nitride, alumina, silica and an oxide of the respective Group 2a element shown in Table 1 were mixed to obtain a powder having the respective formulation shown in Table 1. A binder was added to each powder. The resulting each powder was spray dried to obtain the respective granular powder having an average particle diameter of 50 μm. The powder was subjected to dewaxing at 500° C. for 2 hours, and then sintered at 1,300° C. for 2 hours to obtain a sintered powder having an average particle diameter of 50 μm.

3) Formation of Sprayed Coating

Using the base material prepared in 1) above, nitrogen and hydrogen were flown as plasma gases at a rate of 40 SLM and 12 SLM, respectively, using a plasma spraying device as shown in FIG. 1, and a spraying gun was moved at a rate of 400 mm/sec while adjusting a spraying distance to 60 mm to form plasma with a power of 30 kW, thereby pre-heating the base material without supplying a raw material powder.

Each of the raw material powders as prepared in 2) above was sprayed five times at a supply rate of 15 g/min while moving a spraying gun at a rate of 400 mm/sec, a pitch of 4 mm and a spraying distance of 60 mm, to form a sprayed coating.

4) Performance Evaluation

Measurement tests were conducted to each sprayed coating formed in 3) above on surface roughness (Ra) by a contact-type surface roughness tester, confirmation of vitrification by X-ray diffractometry, and etching rate and amount of particles when exposed to a plasma containing a fluorine-based gas. The etching conditions were that the pressure in a reaction treatment chamber was adjusted at 1 Torr, a $CF_4$ gas was used as the reaction gas, and a high-frequency electric power of 300 W was applied between electrode plates, to generate plasma. The etching thickness was measured using a level difference measurement method, and the particle generation was evaluated by observing particulate substances on the surface of the corrosion-resistant member by a scanning electron microscope. The results on surface roughness (Ra), etching rate and amount of particles were shown in Table 1. All of the corrosion-resistant members had a low etching rate as 0.2 μm/hr or smaller, was excellent in corrosion resistance, and was less in the particle generation. Further, vitrification of all sprayed coatings were confirmed by X-ray diffractometry.

EXAMPLES 4 TO 7

5) Preparation of Base Material to Be Sprayed

Quartz glass was blast treated to have a surface roughness (Ra) of 5 μm. The quartz glass was further treated with 24% hydrofluoric acid for 1 hour to have a surface roughness (Ra) of 10 μm. Thus, a quartz glass base material was obtained.

6) Preparation of Raw Material Powder for Spraying

Silicon nitride, silica, an oxide of the respective Group 3a element shown in Table 2, and zirconia or titania were mixed to obtain a powder having the respective formulation shown in Table 2. A binder was added to each powder. The resulting each powder was spray dried to obtain the respective granular powder having an average particle diameter of 50 μm. The powder was subjected to dewaxing at 500° C. for 2 hours, and then sintered at 1,200° C. for 2 hours to obtain a sintered powder having an average particle diameter of 50 μm.

7) Formation of Sprayed Coating

The base material prepared in 5) above was pre-heated in the same manner as in 3) above.

Each of the raw material powders as prepared in 6) above was sprayed fifteen times at a supply rate of 7 g/min while moving a spraying gun at a rate of 400 mm/sec, a pitch of 4 mm and a spraying distance of 60 mm, to form a sprayed coating.

8) Performance Evaluation

Each sprayed coating having the respective composition obtained in 7) above was evaluated on measurement of surface roughness (Ra) by a contact-type surface roughness tester, confirmation of a constituent phase by X-ray diffractometry, measurement of porosity by SEM observation of a cross-section, measurement of nitrogen content by measurement of thermal conductivity of nitrogen generated after decomposing a cut sprayed coating in a furnace, etching rate and amount of particles when exposed to a plasma containing a fluorine-based gas, and peelability of a sprayed coating by dipping in 10% hydrofluoric acid for 1 hour.

The etching conditions were that the pressure in a reaction treatment chamber was adjusted at 1 Torr, a $CF_4$ gas was used as the reaction gas, and a high-frequency electric power of 300 W was applied between electrode plates, to generate plasma. The sprayed coating surface to be etched was polished to have Ra of 0.1 μm or smaller. The etching thickness was measured using a level difference measurement method, and the particle generation was evaluated by observing the surface of a quartz glass placed adjacent a test sample when etching. The results on surface roughness (Ra), constituent phase, porosity, nitrogen content, etching rate and amount of particles are shown in Table 2. All of the corrosion-resistant members were dense, had a low etching rate as 0.1 μm/hr or smaller, was excellent in corrosion resistance, and was less in the particle generation. Further, all of the sprayed coating maintained adhesion without peeling the coating even by dipping in hydrofluoric acid.

EXAMPLES 8 TO 29

9) Preparation of Raw Material Powder for Spraying

A compound selected from an oxide of the respective Group 2a/3a element shown in Table 3, zirconia, titania and boric acid, silica and silicon nitride were mixed to obtain a powder having the respective formulation shown in Table 3. A binder was added to each powder. The resulting each powder was spray dried to obtain the respective granular powder having an average particle diameter of 50 μm. The powder was subjected to dewaxing at 500° C. for 2 hours, and then sintered at 1,200° C. for 2 hours to obtain a sintered powder having an average particle diameter of 50 μm.

Separately, a compound selected from an oxide of the respective Group 2a/3a element shown in Table 3, zirconia and titania, silica and boron nitride were mixed to obtain a powder having the respective formulation shown in Table 3. A binder was added to each powder. The resulting each powder was spray dried to obtain the respective granular powder having an average particle diameter of 50 μm. The powder was subjected to dewaxing at 500° C. for 2 hours, and then sintered at 1,200° C. for 2 hours to obtain a sintered powder having an average particle diameter of 50 μm.

10) Formation of Corrosion-Resistant Glass Sprayed Coating

The base material prepared in 5) above was pre-heated in the same manner as in 3) above.

Each of the raw material powders as prepared in 9) above was sprayed fifteen times at a supply rate of 7 g/min while moving a spraying gun at a rate of 400 mm/sec, a pitch of 4 mm and a spraying distance of 60 mm, to form a sprayed coating.

11) Performance Evaluation

Each sprayed coating having the respective composition obtained in 10) above was evaluated on measurement of surface roughness (Ra) by a contact-type surface roughness tester, confirmation of a constituent phase by X-ray diffractometry, confirmation of glass phase, measurement of porosity by SEM observation of a cross-section, measurement of nitrogen content by measurement of thermal conductivity of nitrogen generated after decomposing a cut sprayed coating in a furnace, and etching rate and amount of particles when exposed to a plasma containing a fluorine-based gas. The evaluation conditions were the same as in 8) above. The results obtained are shown in Table 3. All of the corrosion-resistant members were dense, had a low etching rate as 0.1 μm/hr or smaller, was excellent in corrosion resistance, and was less in the particle generation.

COMPARATIVE EXAMPLES 1 TO 3

Using each raw material for spraying having the respective formulation shown in Table 1, each sprayed coating was formed in the same manners as in 1) to 3) above, and the performance evaluation was made in the same manner as in 4) above.

The member obtained in Comparative Example 1 was confirmed to be glass. However, the etching rate was large as compared with that of the corrosion-resistant members of the Examples, and thus the member had poor corrosion resistance.

The member obtained in Comparative Example 2 has large etching rate as compared with that of the corrosion-resistant members of the Examples. Further, the member was not vitreous. Therefore, as compared with the corrosion-resistant members of the Examples, the amount of particles generated was large, and corrosion resistance was poor.

$Y_2O_3$ sprayed coating obtained in Comparative Example 3 had low etching rate, but as compared with the vitreous corrosion-resistant members of the Examples, generation of particles was large.

COMPARATIVE EXAMPLES 4 TO 7

Using each raw material for spraying having the respective formulation shown in Table 2, each sprayed coating was formed in the same manners as in 5) to 7) above, and the performance evaluation was made in the same manner as in 8) above.

The member obtained in Comparative Example 4 was confirmed that the constituent phase was glass. However, the etching rate was large as compared with that of the corrosion-resistant members of the Examples, and thus the member had poor corrosion resistance. Porosity and Ra after etching were large, and particles generate in etching for a long period of time.

The alumina sintered body in Comparative Example 5 and the sprayed coating in Comparative Example 6 had a large etching rate, and generation of particles was large, as compared with those of the corrosion-resistant members of the Examples. Further, in the alumina sprayed coating, a gap was observed between the base material and the sprayed coating in a dipping test with hydrofluoric acid. The quartz glass base material without a corrosion-resistant member in Comparative Example 7 was that an etching rate was large as 6 μm/hr, and thus a corrosion resistance was poor.

COMPARATIVE EXAMPLES 8 TO 10

Using each raw material for spraying having the respective formulation shown in Table 3, each sprayed coating was formed in the same manners as in 9) to 10) above, and the performance evaluation was made in the same manner as in 11) above.

In the member of Comparative Example 8 using granulated magnesium oxide powder, the etching rate was large as compared with that of the corrosion-resistant members of the Examples, and particles generated in large amount. In the member of Comparative Example 9 using the commercially available partially stabilized zirconia powder for spraying, the etching rate was large as compared with that of the corrosion-resistant members of the Examples, and particles generated in large amount. In the member of Comparative Example 10 using a raw material powder for spraying prepared from silica, zirconium and magnesium powders in the formulation shown in Table 3, the etching rate was large as compared with that of the corrosion-resistant members of the Examples, and particles generated in large amount.

TABLE 1

| | Component composition (ratio in number of atoms) | | | Base material used | Coating thickness | Ra | Etching Rate | Particles (large, medium, |
|---|---|---|---|---|---|---|---|---|
| | Si:Al | O:N | Al + Si:2a (element) | (surface roughness, μm) | (mm) | (μm) | (μm/hr) | small) |
| Example 1 | 7:1 | 86:14 | 4:1 (Ca) | Quartz glass (Ra = 10 μm) | 0.27 | 4 | 0.16 | Small |
| Example 2 | 65:15 | 86:14 | 4:1 (Mg) | Quartz glass | 0.21 | 4 | 0.15 | Small |

TABLE 1-continued

| | Component composition (ratio in number of atoms) | | | Base material used (surface roughness, μm) | Coating thickness (mm) | Ra (μm) | Etching Rate (μm/hr) | Particles (large, medium, small) |
|---|---|---|---|---|---|---|---|---|
| | Si:Al | O:N | Al + Si:2a (element) | | | | | |
| Example 3 | 65:5 | 86:14 | 7:3 (Ca) | Quartz glass (Ra = 10 μm) | 0.24 | 5 | 0.13 | Small |
| Comparative Example 1 | 75:25 | 100:0 | 2:1 (Y) | Quartz glass (Ra = 10 μm) | 0.26 | 5 | 0.41 | Small |
| Comparative Example 2 | 40:60 | 43:57 | 90:10 (Y) | Quartz glass (Ra = 10 μm) | 0.23 | 3 | 0.43 | Large |
| Comparative Example 3 | $Y_2O_3$ sprayed coating | | | Quartz glass (Ra = 10 μm) | 0.20 | 3 | 0.54 | Large |

TABLE 2

| | Raw material component composition (ratio in number of atoms) | | Coating thickness (mm) | Ra (μm) | Constituent phase | Porosity (%) | Nitrogen Content (wt %) |
|---|---|---|---|---|---|---|---|
| | Si:(element):3a(element) | O:N | | | | | |
| Example 4 | 50:17(Zr):33(Y) | 98:2 | 0.31 | 3 | c-$ZrO_2$ ($Y_2O_3$ solid solution) Glass | 3 | 0.04 |
| Example 5 | 50:17(Ti):33(Y) | 98:2 | 0.29 | 4 | $Y_2TiO_5$ Glass | 2 | 0.03 |
| Example 6 | 50:17(Zr):33(Y) | 85:15 | 0.24 | 4 | c-$ZrO_2$ ($Y_2O_3$ solid solution) Glass | 3 | 2.86 |
| Example 7 | 50:17(Zr):33(Y) | 93:7 | 0.26 | 3 | c-$ZrO_2$ ($Y_2O_3$ solid solution) Glass | 3 | 1.1 |
| Comparative Example 4 | 50:17(Al):33(Y) | 93:7 | 0.26 | 4 | Glass | 10 | 1.20 |
| Comparative Example 5 | 0:100(Al):0 | 100:0 | | | Alumina sintered body α-$Al_2O_3$ | — | 0 |
| Comparative Example 6 | 0:100(Al):0 | 100:0 | 0.25 | 5 | α-$Al_2O_3$ | 7 | 0 |
| Comparative Example 7 | 100:0:0 | 100:0 | | | Quartz glass bulk Glass | — | 0 |

| | Nitrogen content in Sprayed coating (O:N ratio) | Etching rate (μm/hr) | Particles (large, medium, small) | Ra before etching (μm) | Ra after etching (μm) | Peeling of sprayed coating by hydrofluoric acid |
|---|---|---|---|---|---|---|
| Example 4 | 99.8:0.2 | 0.03 | Small | 0.02 | 0.03 | Not observed |
| Example 5 | 99.8:0.2 | 0.05 | Small | 0.02 | 0.02 | Not observed |
| Example 6 | 86.8:13.2 | 0.01 | Small | 0.02 | 0.02 | Not observed |
| Example 7 | 94.9:5.1 | 0.02 | Small | 0.02 | 0.02 | Not observed |
| Comparative Example 4 | 94.9:5.1 | 0.13 | Small | 0.07 | 0.3 | Not observed |
| Comparative Example 5 | — | 0.58 | Large | 0.02 | 0.3 | — |
| Comparative Example 6 | — | 0.62 | Large | 0.03 | 0.3 | Observed |
| Comparative Example 7 | — | 6.09 | Small | 0.01 | 0.01 | — |

TABLE 3

| | Raw material component composition (ratio in number of atoms) | | | Nitride used | Coating thickness (mm) | Ra of sprayed coating (μm) |
|---|---|---|---|---|---|---|
| | Si:(element) | O:N | Si + (element):2a/3a (element) | | | |
| Example 8 | 50:17 (Zr) | 86:14 | 2:1 (Mg) | Silicon nitride | 0.31 | 3 |
| Example 9 | 58:8 (Zr) | 86:14 | 2:1 (Mg) | Silicon nitride | 0.29 | 3 |
| Example 10 | 46:7 (Zr) | 86:14 | 10:9 (Mg) | Silicon nitride | 0.24 | 3 |
| Example 11 | 39:13 (Zr) | 86:14 | 10:9 (Mg) | Silicon nitride | 0.26 | 3 |
| Example 12 | 33:33 (Zr) | 86:14 | 2:1 (Mg) | Silicon nitride | 0.33 | 3 |
| Example 13 | 50:17 (Ti) | 86:14 | 2:1 (Mg) | Silicon nitride | 0.30 | 3 |
| Example 14 | 50:50 (Ti) | 86:14 | 7:3 (Mg) | Silicon nitride | 0.30 | 3 |
| Example 15 | 75:25 | 86:14 | 1:1 | Silicon | 0.26 | 3 |

TABLE 3-continued

| | (Ti) | | (Mg) | nitride | | |
|---|---|---|---|---|---|---|
| Example 16 | 50:17 (B) | 86:14 | 2:1 (Mg) | Boron nitride | 0.35 | 3 |
| Example 17 | 25:75 (B) | 86:14 | 3:2 (Mg) | Boron nitride | 0.27 | 4 |
| Example 18 | 75:25 (B) | 86:14 | 1:1 (Mg) | Boron nitride | 0.29 | 3 |
| Example 19 | 38:13 (Zr) | 86:14 | 1:1 (Y) | Silicon nitride | 0.25 | 3 |
| Example 20 | 60:20 (Zr) | 86:14 | 4:1 (Y) | Silicon nitride | 0.34 | 4 |
| Example 21 | 33:33 (Zr) | 86:14 | 2:1 (Y) | Silicon nitride | 0.31 | 4 |
| Example 22 | 58:8 (Zr) | 86:14 | 2:1 (Y) | Silicon nitride | 0.27 | 4 |
| Example 23 | 25:75 (Zr) | 86:14 | 1:1 (Y) | Silicon nitride | 0.27 | 4 |
| Example 24 | 75:25 (Ti) | 86:14 | 4:1 (Y) | Silicon nitride | 0.36 | 5 |
| Example 25 | 50:50 (Ti) | 86:14 | 70:30 (Y) | Silicon nitride | 0.26 | 3 |
| Example 26 | 75:25 (Ti) | 86:14 | 1:11 (Y) | Silicon nitride | 0.29 | 5 |
| Example 27 | 50:50 (B) | 86:14 | 2:1 (Y) | Boron nitride | 0.30 | 3 |
| Example 28 | 50:50 (B) | 86:14 | 7:3 (Y) | Boron nitride | 0.30 | 4 |
| Example 29 | 75:25 (B) | 86:14 | 1:1 (Y) | Boron nitride | 0.28 | 3 |
| Comparative Example 8 | — | — | MgO sprayed coating | — | 0.36 | 6 |
| Comparative Example 9 | 0:100 (Zr) | 100:0 | 97:3 (Y) | — | 0.30 | 6 |
| Comparative Example 10 | 50:17 (Zr) | 100:0 | 2:1 (Mg) | — | 0.36 | 6 |

| | Constituent phase | Porosity (%) | Nitrogen Content in Sprayed coating (O:N ratio) | Etching rate (μm/hr) |
|---|---|---|---|---|
| Example 8 | c-ZrO$_2$ (MgO solid solution) MgSiO$_3$ Glass | 6 | 96.8:3.2 | 0.04 |
| Example 9 | Glass | 3 | 97.1:2.9 | 0.03 |
| Example 10 | Glass | 3 | 97.2:2.8 | 0.02 |
| Example 11 | c-ZrO$_2$ (MgO solid solution) MgSiO$_3$ Glass | 6 | 96.5:3.5 | 0.03 |
| Example 12 | Glass c-ZrO$_2$ (MgO solid solution) | 3 | 96.1:3.9 | 0.02 |
| Example 13 | Glass | 4 | 97.9:2.1 | 0.04 |
| Example 14 | Glass MgTiO$_3$ | 3 | 98.2:1.8 | 0.04 |
| Example 15 | Glass | 3 | 97.5:2.5 | 0.03 |
| Example 16 | Glass | 3 | 96.7:3.3 | 0.04 |
| Example 17 | Glass BN | 5 | 98.4:1.6 | 0.09 |
| Example 18 | Glass | 3 | 95.4:4.6 | 0.03 |
| Example 19 | Glass | 3 | 99.9:0.1 | 0.03 |
| | c-ZrO$_2$ (Y$_2$O$_3$ solid solution) | | | |
| Example 20 | Glass c-ZrO$_2$ (Y$_2$O$_3$ solid solution) | 8 | 97.8:2.2 | 0.06 |
| Example 21 | Glass c-ZrO$_2$ (Y$_2$O$_3$ solid solution) | 7 | 99.6:0.4 | 0.02 |
| Example 22 | Glass | 5 | 98.1:1.9 | 0.03 |
| Example 23 | Glass c-ZrO$_2$ (Y$_2$O$_3$ solid solution) | 14 | 98.4:1.6 | 0.05 |
| Example 24 | Glass Y$_2$TiO$_5$ | 9 | 98.9:1.1 | 0.06 |
| Example 25 | Glass | 6 | 99.2:0.8 | 0.04 |
| Example 26 | Glass Y$_2$TiO$_5$ | 8 | 99.3:0.7 | 0.03 |
| Example 27 | Glass BN | 2 | 96.1:3.9 | 0.03 |
| Example 28 | Glass BN | 3 | 95.9:4.1 | 0.03 |
| Example 29 | Glass | 4 | 94.5:5.5 | 0.04 |
| Comparative Example 8 | MgO | 10 | — | 0.21 |
| Comparative Example 9 | t-ZrO$_2$ (Y$_2$O$_3$ solid solution) | 7 | — | 0.24 |
| Comparative Example 10 | c-ZrO$_2$ (MgO solid solution) MgSiO$_3$ Glass | 10 | — | 0.25 |

| | Particle (large, medium, small) | Ra before etching (μm) | Ra after etching (μm) |
|---|---|---|---|
| Example 8 | Small | 0.03 | 0.05 |
| Example 9 | Small | 0.04 | 0.06 |
| Example 10 | Small | 0.02 | 0.02 |
| Example 11 | Small | 0.02 | 0.02 |
| Example 12 | Small | 0.02 | 0.02 |
| Example 13 | Small | 0.03 | 0.04 |
| Example 14 | Small | 0.02 | 0.04 |
| Example 15 | Small | 0.03 | 0.04 |
| Example 16 | Small | 0.03 | 0.04 |
| Example 17 | Small | 0.04 | 0.08 |
| Example 18 | Small | 0.02 | 0.03 |
| Example 19 | Small | 0.03 | 0.03 |
| Example 20 | Small | 0.07 | 0.10 |
| Example 21 | Small | 0.10 | 0.12 |
| Example 22 | Small | 0.06 | 0.08 |
| Example 23 | Medium | 0.08 | 0.13 |
| Example 24 | Small | 0.06 | 0.10 |
| Example 25 | Small | 0.03 | 0.05 |
| Example 26 | Small | 0.04 | 0.08 |
| Example 27 | Small | 0.02 | 0.04 |
| Example 28 | Small | 0.03 | 0.05 |
| Example 29 | Small | 0.03 | 0.05 |
| Comparative Example 8 | Large | 0.16 | 0.20 |
| Comparative Example 9 | Large | 0.10 | 0.24 |
| Comparative Example 10 | Large | 0.13 | 0.18 |

It should further be apparent to those skilled in the art that various changes in form and detail of the invention as shown and described above may be made. It is intended that such changes be included within the spirit and scope of the claims appended hereto.

This application is based on Japanese Patent Application No. 2004-85007 filed Mar. 23, 2004, and Japanese Patent Application No. 2004-287477 filed Sep. 30, 2004, the disclosures of which are incorporated herein by reference in their entireties.

What is claimed is:

1. The corrosion-resistant member comprising a base material having formed thereon a sprayed coating, the sprayed coating being formed on a side of the base material to be exposed to corrosive gases or plasma and comprising Si, O, N, Group 2a element, and Zr, having a composition that Zr:Si in ratio of the number of atoms are in a range of from 5:95 to 70:30, O:N in ratio of the number of atoms are in a range of from 99.9:0.1 to 60:40, and Zr+Si: Group 2a element in ratio of the number of atoms are in a range of from 75:25 to 40:60, wherein the sprayed coating comprises a glass phase comprising Si, O, N, Group 2a element, and a crystal phase.

2. The corrosion-resistant member as claimed in claim 1, wherein the crystal phase is cubic zirconium oxide having solid solubilized therein an oxide of Group 2a element.

3. A corrosion-resistant member comprising a base material having formed thereon a sprayed coating, the sprayed coating being formed on a side of the base material to be exposed to corrosive gases or plasma and comprising Si, O, N, Group 3a element, and at least one element selected from the group consisting of B, Zr and Ti, having a concentration of the Group 3a element which is in a range of 10-78%, a concentration of Si which is in a range of 20-88%, a concentration of Zr and/or Ti which is in a range of 2-70%, and a concentration of nitrogen which is in a range of 0.01-15 wt %, wherein the sprayed coating comprises a glass phase comprising Si, O, N, Group 3a element, and a crystal phase comprising at least one member selected from the group consisting of Zr and Ti.

4. The corrosion-resistant member as claimed in claim 3, wherein the crystal phase is cubic zirconium oxide having solid solubilized therein an oxide of Group 3a element.

5. A corrosion-resistant member comprising a base material having formed thereon a sprayed coating, the sprayed coating being formed on a side of the base material to be exposed to corrosive gases or plasma and comprising Si, O, N, Group 3a element, and at least one element selected from the group consisting of B, Zr and Ti, having a concentration of the Group 3a element which is in a range of 10-78%, a concentration of Si which is in a range of 20-88%, a concentration of Zr and/or Ti which is in a range of 2-70%, and a concentration of nitrogen which is in a range of 0.01-15 wt %, wherein the sprayed coating comprises a glass phase comprising Si, O, N, Group 3a element, and a crystal phase comprising B.

6. The corrosion-resistant member as claimed in claim 5, wherein the crystal phase comprises boron nitride.

7. The corrosion-resistant member comprising a base material having formed thereon a sprayed coating, the sprayed coating being formed on a side of the base material to be exposed to corrosive gases or plasma and comprising Si, O, N, Group 2a element, and Ti, having a composition that Ti:Si in ratio of the number of atoms are in a range of from 5:95 to 80:20, O:N in ratio of the number of atoms are in a range of from 99.9:0.1 to 60:40, and Ti+Si: Group 2a element in ratio of the number of atoms are in a range of from 85:15 to 40:60, wherein the sprayed coating comprises a glass phase comprising Si, O, N, Group 2a element, and a crystal phase.

* * * * *